(12) United States Patent
Behrendt et al.

(10) Patent No.: US 8,414,821 B2
(45) Date of Patent: Apr. 9, 2013

(54) FLEECE MEDIUM, IT'S MANUFACTURING METHOD AND A FILTER ELEMENT MADE OF IT

(75) Inventors: Nico Behrendt, Ludwigsburg (DE); Stefan Orendt, Mainleus (DE)

(73) Assignee: Mann + Hummel GmbH, Ludwigsburg (DE)

( * ) Notice: Subject to any disclaimer, the term of this patent is extended or adjusted under 35 U.S.C. 154(b) by 535 days.

(21) Appl. No.: 12/608,216

(22) Filed: Oct. 29, 2009

(65) Prior Publication Data

US 2010/0107578 A1    May 6, 2010

(30) Foreign Application Priority Data

Oct. 31, 2008   (DE) .......................... 10 2008 054 188

(51) Int. Cl.
*D01D 5/00* (2006.01)

(52) U.S. Cl.
USPC ... 264/465; 264/484; 264/172.9; 264/177.17; 264/DIG. 48

(58) Field of Classification Search .................. 55/486, 55/527, DIG. 5; 95/273, 90, 117; 96/154, 96/153; 210/489, 493.1, 500.1, 491, 767, 210/505, 679, 457, 502.1; 264/484, DIG. 48, 264/465, 510, 145; 442/351, 344, 347, 50, 442/381; 428/220, 216, 332, 401, 373, 374
See application file for complete search history.

(56) References Cited

U.S. PATENT DOCUMENTS

| | | | |
|---|---|---|---|
| 7,988,860 B2* | 8/2011 | Kalayci et al. | 210/679 |
| 8,129,450 B2* | 3/2012 | Wood et al. | 524/48 |
| 2008/0302072 A1* | 12/2008 | Hassmann et al. | 55/486 |
| 2009/0266759 A1* | 10/2009 | Green | 210/489 |
| 2010/0181249 A1* | 7/2010 | Green et al. | 210/493.1 |
| 2011/0031656 A1* | 2/2011 | Anneaux et al. | 264/484 |
| 2011/0064949 A1* | 3/2011 | Bolick et al. | 428/394 |
| 2011/0138685 A1* | 6/2011 | Kalayci et al. | 44/451 |
| 2011/0168625 A1* | 7/2011 | Gupta et al. | 210/500.1 |
| 2011/0226690 A1* | 9/2011 | Kalayci | 210/491 |
| 2011/0253645 A1* | 10/2011 | Hassmann et al. | 210/767 |
| 2011/0293485 A1* | 12/2011 | Dallas et al. | 422/129 |

FOREIGN PATENT DOCUMENTS

| | | |
|---|---|---|
| DE | 4402857 | 8/1995 |
| DE | 29907699 | 8/1999 |
| DE | 10063518 | 7/2002 |
| DE | 10155448 | 2/2003 |
| EP | 0818230 | 1/1998 |
| EP | 1366791 | 12/2003 |
| EP | 1733776 | 12/2006 |

* cited by examiner

*Primary Examiner* — Duane Smith
*Assistant Examiner* — Minh-Chau Pham
(74) *Attorney, Agent, or Firm* — James Hasselbeck

(57) ABSTRACT

A method for electrostatic spinning of thermoplastic polymers for obtaining nano and microfibers, is introduced. The method if characterized by the following steps: solving the thermoplastic polymer in a corresponding solvent; adding a thermoplastic elastomer (TPE) to this solution, and introducing the solution into an electric field and spinning under the effect of the electric field to nano and microfibers.

13 Claims, 4 Drawing Sheets

FLEECE MEDIUM, IT'S MANUFACTURING METHOD AND A FILTER ELEMENT MADE OF IT

CROSS REFERENCE TO RELATED APPLICATIONS

Priority is claimed based on Federal Republic of Germany patent application no. DE 102008054188.5 filed Oct. 31, 2008, the entire disclosure of which is incorporated herein by reference.

TECHNICAL FIELD

The invention relates in general to a fleece medium and to a method for manufacturing such a fleece medium. The invention relates in particular to a fleece medium with nanofibers or microfibers deposited on it. In particular, it relates to a filter element manufactured with this fleece medium.

BACKGROUND OF THE INVENTION

Electro-spinning processes for manufacturing polymer fibers made of polymer solutions are already known for a long time [cf. for instance R. Dersch et al., Chemie in unserer Zeit, Vol. 39, pp. 26-35, 2005]. According to this principle, a plurality of polymers can be spun to fibers. The respective polymer is dissolved by means of a solvent, and applying a high voltage produces nano and/or microfibers with a minimum diameter of up to 50 nm.

There are already a certain number of publications dealing with spinning of thermoplastic polymers such as, for instance, polystyrene (PS), in the electrical field.

Frequently used solvents for electro-spinning are tetrahydrofuran (THF-S. Me-gelski et al., Macromolecules Vol. 35 (22), 8456-8466, 2002 and J. S. Stephens et al., Applied Spectroscopy, Vol. 55 (10), 1287-1290), dimethylformamide (DMF-S. Megelski et al., Macromolecules Vol. 35 (22), 8456-8466, 2002 and J. A. E. Senador et al., Mat. Res. Soc. Symp. Proc. Vol. 661, KK 5.9.1.-OKK5.9., 2001) and methyl ethyl ketone (MEK-H. F. Jia et al., Biotechnology Progress, Vol. 18 (5), 1027-1032, 2002.

The use of nano and/or microfibers, i.e. fibers with an average fiber diameter of 10 to 1000 nm, for coating fleece materials to be used as filter media is well known.

For example the methods described in DE 100 63 518 A1 and 101 55 448 A1 for manufacturing polystyrene nano and microfibers and/or for coating fleece media with thermoplastic polymer nano and microfibers are suited to be used for manufacturing filter media with a relatively high separation efficiency and relatively low aerodynamic resistance.

However, when using these thermoplastic polymer nano and/or microfibers as coating for fleece it becomes clear that the fibers deposited by the electro-spinning process have a relatively poor adhesion property on the carrier fleece. This applies particularly to structured (studded) media. The contact surface for nanofibers is quite small, for only the elevations are covered with it. When using such structured media, minor forces (e.g. winding or unwinding of the coated fleece) can detach the nanofibers. If the coated fleece is mechanically stressed due to pleating or similar processing methods, the nano and/or microfibers on the carrier fleece are severely damaged. This applies in particular to abrasive shear forces which can be applied, for example, by roller systems required for manufacturing.

To reduce the damage of the nano and/or microfibers to an absolute minimum several concepts with hot-melt adhesives or hot-melt adhesive layers have been described, for example in EP 818 230 B1. Water soluble and strongly hydrophilic polymers, such as polyvinyl alcohols, have a high tack, particularly at high air humidity, such as for example described in DE 299 076 99 U1.

Furthermore, EP 1 366 791 A1 discloses a method for manufacturing electrostatically spun polymer fibers with a cross-linking agent, such as for example polyvinyl alcohol or urea-formaldehyde resin. The use of the cross-linking agent increases the adhesion efficiency (the tack) of the nano and/or microfibers.

EP 1 733 776 A2 presents polyvinyl chloride and/or polyvinyl alcohol nanofibers stabilized against heat and impact power. Stabilization is reached by adding a cross-linking polymer, such as for example epoxy resins.

Finally, DE 44 02 857 A1 describes a blend consisting of two incompatible polymers spun in the electrical field. One blending component consists of a polymer that becomes tacky at room temperature, the other one consists of a polymer with a softening range above room temperature. Spinning such a blend electrostatically generates tacky nanofibers which form a relatively firm bond with the carrier fleece.

Consequently, the objective of the well-known solutions dealing with this problem is to obtain an improved adhesion of the nano and/or microfibers on the carrier fleece medium. This can, for example, be realized by applying bonding agents to a fleece. After that, the nano and/or microfibers are deposited on the fleece provided with the bonding agent. The adhesive is now responsible for bonding fleece and fibers. However, this approach has a few disadvantages:

If the viscosity of the adhesive is too low, i.e. if it is too aqueous, the adhesive spots will melt without ensuring a sufficient adhesion. But if the viscosity is too high, i.e. if it is too viscous, the adhesive spots do not have enough tack and there is no bonding of the fibers.

A great disadvantage of adhesive-based solutions according to the prior art is the frequent increase of pressure drop. The adhesives used tend to form large areas, thus clogging the pores of the filter medium. This significantly increases the aerodynamic resistance of the medium. When using hardenable systems, such as for example epoxy resins, other influencing factors such as the hardening time, the concentration of catalysts, mixing ratios and the like which represent potential sources of error have to be taken into account. When using UV curing systems there is the risk of damaging the carrier fleece by UV rays.

SUMMARY OF THE INVENTION

It is therefore the objective of the present invention to make available nanofibers and/or microfibers which avoid the afore-mentioned disadvantages of the prior art.

Another objective of the present invention is to make available a method for manufacturing these fibers.

Another objective is to make available a fleece medium that is covered with these fibers.

Still another objective is to make available a filter element that comprises such a fleece medium.

These and further objectives will be solved by the method according to claim 1, the fleece medium according to claim 11, and the filter element according to claim 12. Advantageous embodiments of the invention are described in the claims.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
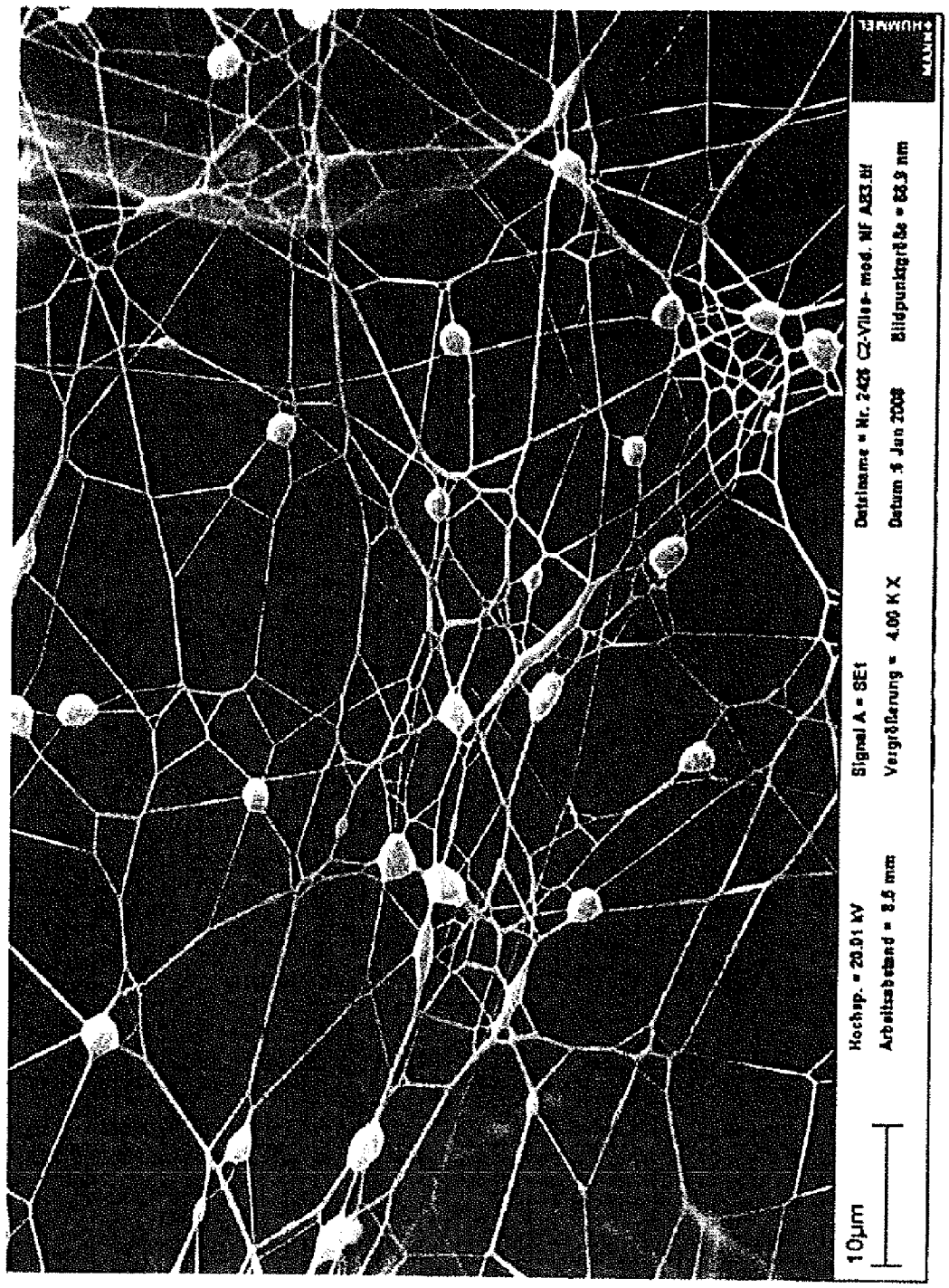
FIG. 1 is a SEM picture of the polystyrene nanofibers modified according to the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a fleece medium with nanofibers and/or microfibers deposited thereon as well as to filter elements manufactured using this fleece. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As discussed above, the objective of the well known solutions is to obtain an improved adhesion of the fibers on the carrier fleece medium. This can, for example, be realized by depositing a bonding agent on the carrier fleece and by subsequently placing the nano and/or microfibers on the fleece treated in such a way. The adhesive is now responsible for bonding fleece and fibers.

In the following disclosure, only the term "nanofibers" will be used. However, a person skilled in the art will readily understand that microfibers can also be used for the present invention. The term "nanofibers" is therefore not intended in a limiting sense.

The present inventive disclosure takes a different approach for stabilizing the nanofibers mechanically without using any adhesives.

According to the invention, the thermoplastic polymer nanofibers are modified with a thermoplastic elastomer (TPE). For that purpose, the TPE is simply dissolved in a solvent together with the thermoplastic polymer used. The TPE concentration in the solvent is between 0.5 and 25 percent by weight, preferably between 0.5 and 10 percent by weight, and also preferably between 2 and 7.5 percent by weight.

The thermoplastic polymer can be selected from a group consisting of polystyrene, polyamide-6, polyamide-6.6, polyamide-6.10, and block copolymer polyamides, such as for example polyamide-6/6.6/13.6, polyetherimides, polycarbonates, polybutylenterephthalates, polyethyleneterephthalates, polysulfones, polyethersulfones as well as polyolefins such as polypropylene and polyethylene, whereby polystyrene is preferred.

Thermoplastic polyurethanes (TPU, such as, for example, Desmopan, Estane, Pellethane, Elastollan, Pearlthane), preferably aromatic thermoplastic polyurethanes such as the aromatic polyester-based thermoplastic polyurethanes Estane® 5778, Estane® 5719 or Estane® 5702 F2/F3 from Lubrizol Corporation, Switzerland, can be used as thermoplastic elastomers. However, other thermoplastic elastomers such as polystyrene polymers (Allruna, Europrene, Thermolast, Multiflex, Onflex), miscible and immiscible blends of polyofins and elastomers (Sarlink, Santoprene, Milastomer, Forprene, Teknor Apex, Vyram, Dexflex, Hifax), thermoplastic copolyamides (Pebax, Vestamid), and thermo-plastic copolyesters (Arnitel, Hytrel, Pibiflex) can be used.

Possible solvents are formic acid, methyl ethyl ketone, acetone, tetrahydrofuran, tetrahydronaphthalene and N-methylpyrrolidon as well as mixtures of the mentioned solvents.

The solution is then spun with the well-known methods in an electrical field with a voltage ranging from 10 to 50 KV, preferably from 20 to 30 KV. As it can be seen in FIG. 1, nanofibers are generated which are interrupted by graft-type structures of TPE in the µm range, and the number of structures can vary, i.e. the TPE is integrated during the spinning process into the fiber web in the form of "roundish" domains. These TPE grafts shown in enlarged form in FIG. 2 are responsible for a higher elasticity, i.e. the nanofibers undergo a mechanical deformation which prevents them from being torn, and the graft-type TPEs expand which allows them to absorb energy.

The graft-type TPE domains contained in the fiber webs have a diameter ranging from approx. 0.05 µm to approx. 50 µm, preferably from approx. 0.1 µm to approx. 5 µm.

From a purely physical point of view, such TPE-modified PS fiber structures can be imagined as a system of ropes which are connected with each other via springs, the springs acting quasi as a kind of "deformation buffer".

If the fleeces coated according to the invention are now pleated then the impact power does not break and/or roll up the nanofibers but only expands the nanofiber network reversibly. Consequently, a major part of the nanofibers is "saved" from the sheetware and integrated into the manufactured filter without impairing the filtering effect.

In the case of the TPE-modified nanofiber coating according to the invention a thermoplastic elastomer (e.g. Estane®) is added to the spinning solution that consists of thermoplastic polymer (e.g. polystyrene) and a solvent (e.g. methyl ethyl ketone).

Figure 2:
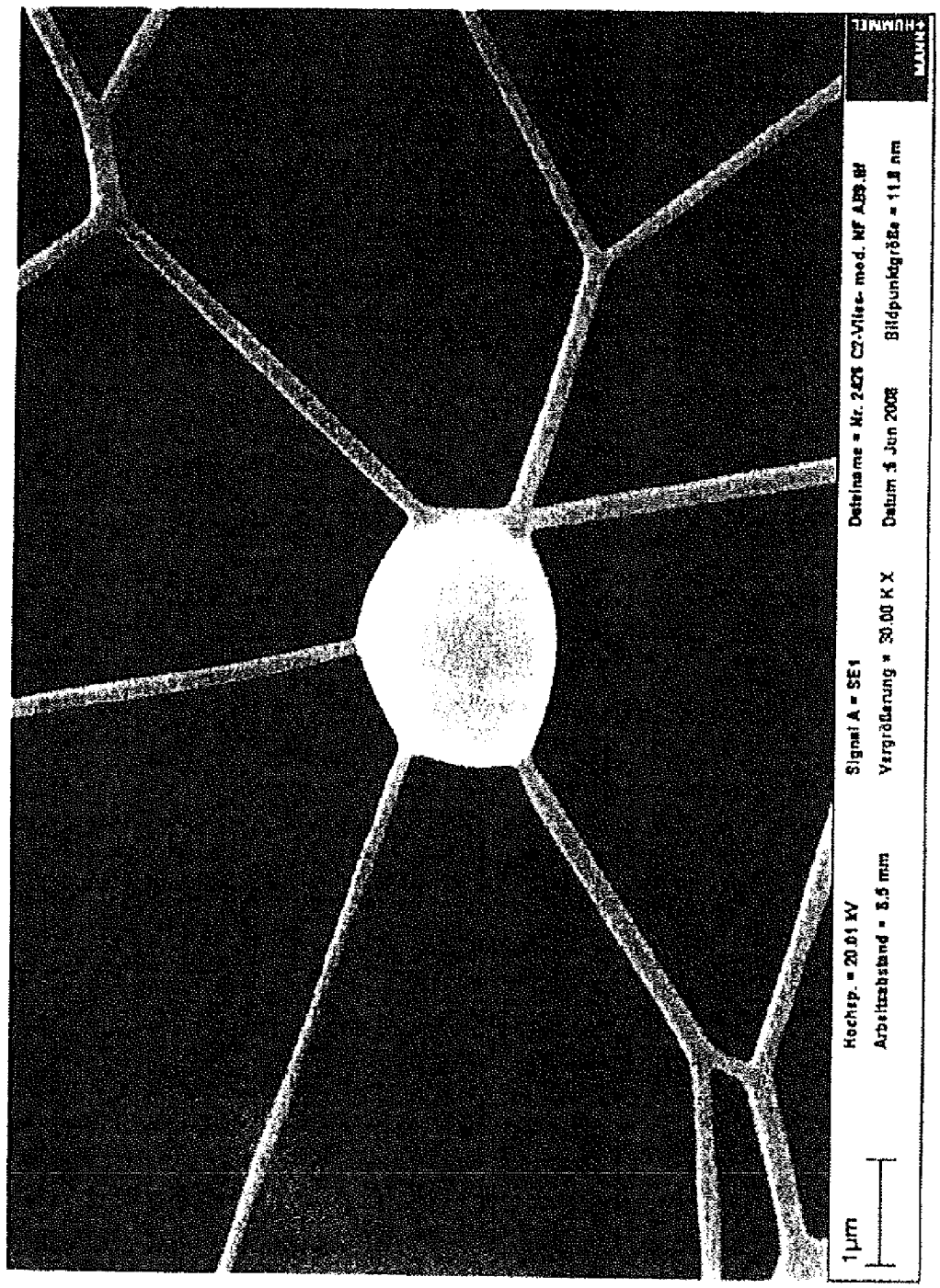
FIG. 2 provides an enlarged section from FIG. 1.
Figure 3:
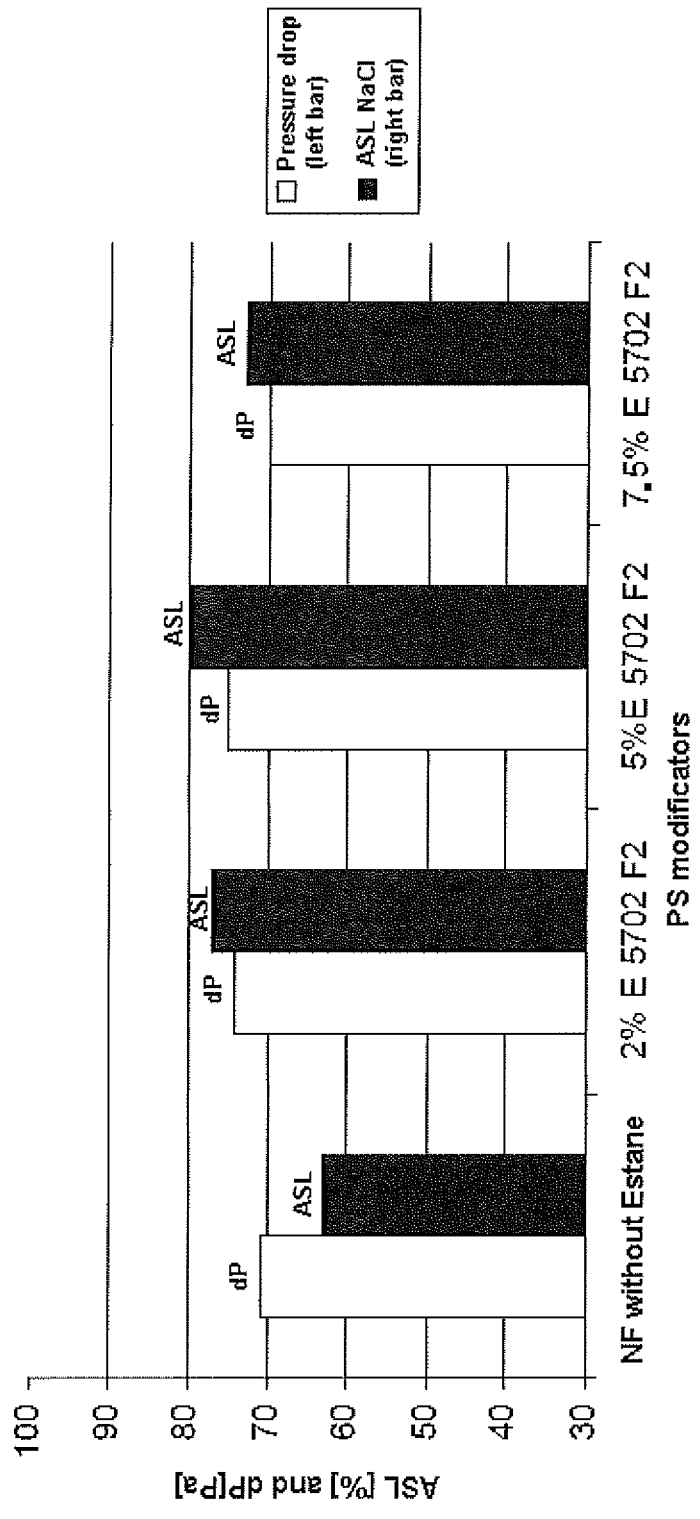
FIG. 3 depicts in graphic representation the influence of different Estane® concentrations on the separation efficiency and pressure drop with studded sheetware treated according to the invention.

During spinning, and in addition to the nanofibers, graft-type TPE agglomerates are formed which act like a spring when exposed to a mechanical tension (cf. FIGS. 1 and 2). These modified nanofibers are then deposited on the carrier fleeces while the fleece medium is led in the well-known manner along the electrodes which function as spray devices for the nanofibers.

The nanofiber coatings obtained by this method are significantly more resistant to mechanical abrasion as may occur when coated fleeces are processed into filter media.

In this way, a significantly larger quantity of the deposited nanofibers can be "saved" from sheetware and integrated into the filter, and the filters manufactured from these media have a better separation efficiency compared with non-modified nanofibers.

The manufacturing process can be realized in such a way that the ratio between TPE domains and polystyrene fibers can be varied, the number of TPE domains being specified by the TPE concentration.

Exemplary embodiments of the invention will now be presented. The following examples shall explain the present invention, it is however not limited to these examples. This also applies to the aromatic polyester-based thermoplastic polyurethane Estane® used exclusively in these examples, however, a person skilled in the art is readily aware that instead of Estane® the thermoplastic elastomers mentioned above can be used with similar and/or identical results.

Example 1

A standard fleece (C2; manufacturer: Irema-Filter GmbH), width 80 cm, which was manufactured with the meltblown method has an area weight of 100 g/m2. This fleece was coated with nanofibers using the electro-spinning method. The tension at the electrodes was 25 kV. The coating solution used was a 10 percent by weight polystyrene solution (polystyrene: BASF 160 KH) in methyl ethyl ketone (MEK) by adding Estane® (Lubrizol Corp.). During the tests for manufacturing filters coated with nanofibers different types of Estane® were used which differ each by different softening ranges as well as by different mechanical properties, e.g. tensile strengths. The Kofler melting temperatures for Estane® 5778 amount to 79 degrees C., for Estane® 5719 to 94 degrees C. and for Estane® 5702 F2/F3 to 73 degrees C., measured according to NOVEON. The tear resistances for Estane® 5778 amount to 80 kN/m (ISO 34-1B), for Estane® 5719 to 60 kN/m (DIN 53515) and for Estane® 5702 F2/F3 to 45 kN/m (DIN 53515). No Estane® was used when coating the reference medium, i.e. the filter without a nanofiber (NF) coating and the filter with NF coating without the addition of TPE. In general, the added Estane® quantity refers to the quantity of polymer used. The coating speed was 4 m/min, this slow speed made it possible to observe the effects according to the invention very clearly and the average nanofiber coating obtained was 0.5 g/m2. When using other, for example higher speeds the nanofiber coating was reduced, all effects in particular between the individual types of Estane® still existed but not so clearly as before.

Figure 4:
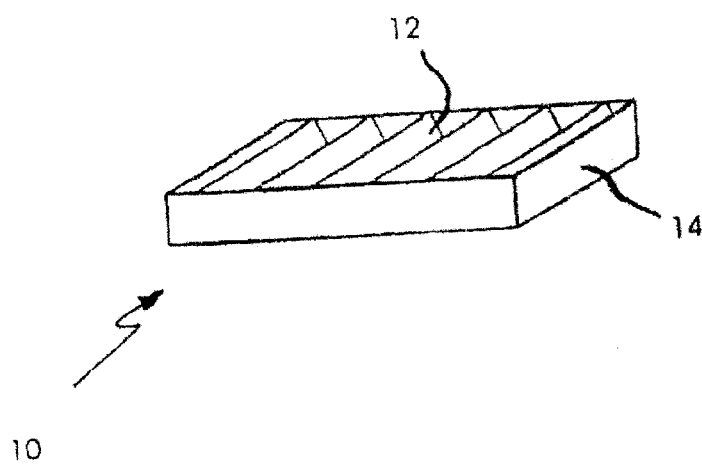
FIG. 4 is a schematic representation of a cabin air filter with a fleece medium according to the invention.

After that, the fleeces were pleated and the pleated fleeces served to produce cabin air filters 10 for motor vehicles as they are shown, for example, in FIG. 4 with the pleated fleece 12 according to the invention and the corresponding lateral strips 14. The person skilled in the art is readily aware that other embodiments such as, for example, round elements and the like, can also be realized. The geometric data of these filters are shown in table 1.

TABLE 1

| | |
|---|---|
| Filter geometry (l × w × h; mm) | 230 × 238 × 30 |
| Flow surface (m$^2$) | 0.05474 |
| Medium surface (m$^2$) | 0.613088 |
| Pleat height (mm) | 28 |
| Distance between pleats (mm) | 5 |
| Number of pleats | 46 |

Table 2 shows the influence of standard nanofibers, i.e. non TPE-modified and TPE modified nanofibers, on the pressure drop, and the NaCl separation efficiency using a sample filter. The filter containing modified nanofibers has a significantly higher NaCl separation efficiency compared with a filter containing standard nanofibers.

TABLE 2

| | NaCl separation [%] in the 0.5-1 μm range | Pressure drop [Pa] at 9 kg/min |
|---|---|---|
| Filter without NF coating | 38 | 53 |
| Filter with NF standard coating without TPE | 51 | 68 |
| Filter with NF coating with 2 percent per weight*) 5702 F2 Estane ® | 74 | 75 |
| Filter with NF coating with 2 percent per weight*) 5719 Estane ® | 71 | 81 |
| Filter with NF coating with 2 percent per weight*) 5778 Estane ® | 77 | 96 |

*)The indication refers to the quantity of polymer used for nanofibers.

Example 2

A studded C2 medium (manufacturer: Irema-Filter GmbH), width 80 cm, which was manufactured with the meltblown method has an area weight of 100 g/m2. This fleece was coated with nanofibers using the electro-spinning method. The tension at the electrodes was 25 kV. The coating solution used was a 10 percent by weight polystyrene solution (polystyrene: BASF 160 KH) in methyl ethyl ketone by adding Estane® 5702 F2 (manufacturer: Lubrizol Corp., Switzerland). When carrying out the tests for manufacturing the filters coated with nanofibers different Estane® concentrations were used to examine more in detail the influence of Estane® concentrations. No Estane® was used for coating the reference medium. The added Estane® quantity 5702 F2 refers to the quantity of polystyrene used. The coating speed was 4 m/min, this slow speed made it possible to observe the effects according to the invention very clearly (cf. page 11) and the average nanofiber coating obtained was 0.5 g/m2. Table 3 shows the influence of standard nanofibers, i.e. non TPE-modified and TPE-modified nanofibers, on the pressure drop, and the NaCl separation efficiency using a sample fleece coated with modified nanofibers unlike a fleece with standard NF coating. The fleeces (sheetware) coated with the modified nanofibers show a significantly higher NaCl separation efficiency compared with fleeces coated with standard nanofibers. The contact surface for nanofibers is, as already mentioned, quite small, for only the elevations of the structured media are covered with it (web-like effect). When using such structured media, minor forces (e.g. winding or unwinding of the coated fleece) can detach the nanofibers. Therefore, measurements/comparisons with sheetware make sense.

TABLE 3

|  | NaCl separation [%] in the 0.5-1 µm range | Pressure drop [Pa] at 9 kg/min |
|---|---|---|
| Studded C2 fleece with standard NF coating without Estane ® | 63 | 71 |
| Studded C2 fleece with NF coating with 2 percent per weight*) 5702 F2 Estane ® | 77 | 74 |
| Studded C2 fleece with NF coating with 5 percent per weight*) 5702 F2 Estane ® | 80 | 75 |
| Studded C2 fleece with NF coating with 7.5 percent per weight*) 5702 F2 Estane ® | 73 | 70 |

*)The indication refers to the quantity of polymer used for nanofibers.

Example 3

A studded C2 fleece medium (area weight 120 g/m2, manufacturer: Irema-Filter GmbH) was coated each with standard nanofibers and with modified nanofibers. This fleece was coated with nanofibers using the electro-spinning method. The tension at the electrodes was 25 kV. The coating solution used was a 10 percent by weight polystyrene solution (polystyrene: BASF 160 KH) in methyl ethyl ketone by adding Estane® 5778 (manufacturer: Lubrizol Corp., Switzerland). No Estane® was used for coating the reference medium. The added Estane® quantity refers to the quantity of polystyrene used. The coating speed was 4 m/min, this slow speed made it possible to observe the effects according to the invention very clearly and the average nanofiber coating obtained was 0.5 g/m2. NF-free fleeces, fleeces coated with standard NF and with modified nanofibers were used to manufacture air filters, the geometric data of which are shown in table 4.

TABLE 4

| Filter geometry (l × w × h; mm) | 298 × 204 × 30 |
|---|---|
| Flow surface (m²) | 5.979 |
| Medium surface (m²) | 0.486 |
| Pleat height (mm) | 28 |
| Distance between pleats (mm) | 7 |
| Number of pleats | 43 |

Table 5 shows the influence of standard nanofibers, i.e. non TPE-modified and TPE-modified nanofibers, on the pressure drop, and the NaCl separation efficiency using a sample filter. The filter containing modified nanofibers shows a significantly higher NaCl separation efficiency compared with a filter containing standard nanofibers.

TABLE 5

|  | NaCl separation [%] in the 0.5-1 µm range | Pressure drop [Pa] at 9 kg/min |
|---|---|---|
| Filter without NF coating | 35 | 66 |
| Filter with NF standard coating without TPE | 61 | 87 |
| Filter with NF coating with 2 percent per weight*) 5778 Estane ® | 87 | 93 |

*)The indication refers to the quantity of polymer used for nanofibers.

As shown in example 1, the filters coated with Estane®-modified nanofibers had significantly higher separation efficiency with moderate pressure drop when compared to those filters which were coated only with standard nanofibers.

Examples 2 and 3 show one more advantage of the invention. If nanofibers are deposited on a studded fleece medium (e.g. studded C2 by Irema-Filter GmbH), a major part of the nanofibers will be destroyed and/or not even deposited on the fleece. This is due to the "web-like effect" of such media, i.e. only the raised areas are able to carry the nanofibers while the recesses are only covered by the nanofibers. Due to this, the nanofibers are, in particular above the recesses, destroyed by an even minor mechanical stress and can no more be used for filtration purposes.

Furthermore, example 2 shows that the modified nanofibers on the studded C2 fleece feature better performance data than the standard nanofibers without thermoplastic elastomer. This result is in turn due to the mechanical deformation buffer effect of the TPE domains.

Example 3 shows that the TPE-modified nanofibers according to the invention are responsible for improved performance data also in the case of studded fleece media.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. A method for electrostatic spinning of thermoplastic polymers for obtaining nanofibers and microfibers, comprising:
   providing a carrier fleece medium;
   forming a solution by dissolving said thermoplastic polymer in a corresponding solvent;
   adding a thermoplastic elastomer (TPE) to said solution such that said solution has a desired TPE concentration;
   introducing said solution into an electric field;
   spinning nanofibers and microfibers under the effect of said electric field;
   forming elastic TPE graft type elastic roundish domains during said spinning step, said TPE graft type elastic roundish domains integrated into said spun nanofibers and microfibers; and integrating said TPE elastic domains during said spinning step into a fiber web of said spun nanofibers and microfibers, said TPE domains elastically connecting said spun nanofibers and microfibers;

depositing a fibrous coating of said TPE integrated nanofibers and microfibers onto said carrier fleece medium;

wherein in said adding step, ratio between said TPE domains and said spun nanofibers and microfibers is adjusted by varying said desired TPE concentration.

2. The method according to claim 1, wherein
in said forming step said thermoplastic polymer is selected from the group consisting of polystyrene, polyamide-6, polyamide-6.6, polyamide-6.10, and block copolymer polyamides; and
wherein said block copolymer polyamides include polyamide-6/6.6/13.6, polyetherimides, polycarbonates, polybutylenterephthalates, polyethyleneterephthalates, polysulfones, polyethersulfones, polyolefins, polypropylene and polyethylene.

3. The method according to claim 1, wherein
in said forming step, said solvent is at least one solvent selected from the group consisting of formic acid, methyl ethyl ketone, acetone, tetrahydrofuran, tetrahydronaphthalene, and N-methylpyrrolidon.

4. The method according to claim 1, wherein
in said adding step, said TPE is selected from the group consisting of thermoplastic polyurethanes, polystyrene polymers, miscible and immiscible blends of polyofins and elastomers, copolyamides and copolyesters.

5. The method according to claim 4, wherein
said thermoplastic polyurethanes are aromatic polyester-based thermoplastic polyurethanes.

6. The method according to claim 1, wherein
in said adding step, between 0.5 and 25 percent by weight of TPE is added in relation to the thermoplastic quantity of polymer used.

7. The method according to claim 6, wherein
in said adding step, between 2 and 7.5 percent by weight of TPE is added in relation to the thermoplastic quantity of polymer used.

8. The method according to claim 1, wherein
in said spinning step, said electrical field has a voltage in a range of 10 to 50 KV.

9. The method according to claim 8, wherein
in said spinning step, said electrical field has a voltage ranging from 20 to 30 KV.

10. The method according to claim 8, wherein
a fiber web of said spun fibers has graft-type TPE domains with a diameter of 0.05 µm up to 50 µm which are connected by network-like structures.

11. The method according to claim 10, wherein
said TPE domains have a diameter of 0.1 µm up to 5 µm.

12. The method according to claim 1, further comprising depositing said nano and microfibers onto a fleece medium.

13. The method according to claim 2, wherein
in said forming step, said solvent is at least one solvent selected from the group consisting of formic acid, methyl ethyl ketone, acetone, tetrahydrofuran, tetrahydronaphthalene, and N-methylpyrrolidon, wherein said block copolymer polyamides include polyamide-6/6.6/13.6, polyetherimides, polycarbonates, polybutylenterephthalates, polyethyleneterephthalates, polysulfones, polyethersulfones, polyolefins, polypropylene and polyethylene;

wherein in said adding step, said TPE is selected from the group consisting of thermoplastic polyurethanes, polystyrene polymers, miscible and immiscible blends of polyofins and elastomers, copolyamides and copolyesters;

wherein in said adding step, between 0.5 and 25 percent by weight of TPE is added in relation to a thermoplastic quantity of polymer used;

wherein in said spinning step, said electrical field has a voltage ranging from 10 to 50 KV; and wherein said fiber web of said spun fibers has graft-type TPE domains with a diameter of approx. 0.05 µm up to approx. 50 µm which are connected by network-like structures.

* * * * *